United States Patent
Shakhin

(10) Patent No.: US 8,765,206 B2
(45) Date of Patent: Jul. 1, 2014

(54) INSTANT FREEZE-DRIED COFFEE AND REGULAR ROASTED COFFEE COMPOSITION AND METHOD OF MAKING SAME

(76) Inventor: Khikmat Vadi Shakhin, Moscow (RU)

(*) Notice: Subject to any disclaimer, the term of this patent is extended or adjusted under 35 U.S.C. 154(b) by 0 days.

(21) Appl. No.: 13/390,349

(22) PCT Filed: Jun. 23, 2010

(86) PCT No.: PCT/RU2010/000349
§ 371 (c)(1),
(2), (4) Date: Mar. 5, 2012

(87) PCT Pub. No.: WO2011/040832
PCT Pub. Date: Apr. 7, 2011

(65) Prior Publication Data
US 2012/0156357 A1    Jun. 21, 2012

(30) Foreign Application Priority Data
Oct. 1, 2009 (RU) ................................ 2009136251

(51) Int. Cl.
*A23F 5/10* (2006.01)

(52) U.S. Cl.
USPC .......... 426/595; 426/432; 426/385; 426/465; 426/466; 426/473

(58) Field of Classification Search
USPC .......................... 426/595, 432, 465, 466, 473
See application file for complete search history.

(56) References Cited

U.S. PATENT DOCUMENTS

| | | | |
|---|---|---|---|
| 2,557,294 A * | 6/1951 | Kellogg | 426/594 |
| 3,261,689 A * | 7/1966 | Ponzoni | 426/310 |
| 3,652,292 A | 3/1972 | Bach et al. | |
| 3,682,650 A * | 8/1972 | Easton et al. | 426/594 |
| 3,697,288 A | 10/1972 | McSwiggin | |
| 3,903,312 A * | 9/1975 | Clinton et al. | 426/594 |
| 4,565,706 A | 1/1986 | Wertheim et al. | |
| 4,594,257 A | 6/1986 | Leblanc et al. | |
| 5,972,409 A * | 10/1999 | Liu et al. | 426/595 |

FOREIGN PATENT DOCUMENTS

| | | |
|---|---|---|
| CA | 1110104 A1 | 10/1981 |
| CA | 2253143 A1 | 5/2000 |
| DE | 2846515 A1 | 5/1979 |
| DE | 19700084  * | 7/1998 |
| EP | 0220889 A2 | 5/1987 |
| EP | 0928561 A1 | 7/1999 |
| GB | 1027926 A | 4/1966 |
| GB | 1102587 A | 2/1968 |
| GB | 2022394 A | 12/1979 |
| WO | WO-9118517 A1 | 12/1991 |
| WO | WO 96/24255 * | 8/1996 |
| WO | WO-9624255 A1 | 8/1996 |
| WO | WO-9729651 A1 | 8/1997 |

OTHER PUBLICATIONS

English Translation for Specification of DE 19700084. published Jul. 1998.*
Nakhmedov, F.G., "Teknologiya kofeproduktov", Legkay i pischevaya promyshlennost, Moscow, 1984, pp. 78-83 (Total 10 pgs.).

* cited by examiner

*Primary Examiner* — Anthony Weier
(74) *Attorney, Agent, or Firm* — Wilmer Cutler Pickering Hale and Dorr LLP

(57) ABSTRACT

A coffee composition based on instant freeze-dried coffee with the taste and aroma characteristics of a regular roasted coffee is provided. A method for obtaining the composition by processing regular roasted fine ground coffee through concentrated liquid coffee extract. This processing combined with freeze drying produces uniformly structured freeze-dried granules with uniform content of regular roasted fine ground coffee inside the granules.

9 Claims, No Drawings

INSTANT FREEZE-DRIED COFFEE AND REGULAR ROASTED COFFEE COMPOSITION AND METHOD OF MAKING SAME

CROSS-REFERENCE TO RELATED APPLICATIONS

This application is a National Stage Entry of International Application No. PCT/RU2010/000349 filed on Jun. 23, 2010, which claims the benefit of priority of RU 2009136251 filed on Oct. 1, 2009.

BACKGROUND OF THE INVENTION

1. Field of the Invention

The present invention is related to food industry, and, in particular, to instant freeze-dried coffee production technology used in coffee production industry.

2. Description of the Related Art

An instant coffee, as a final product, should comply with the key requirements which are often contradictory: to obtain the desired taste, aroma and the body of freshly brewed coffee dissolved in a cup, while preserving organic and inorganic substances contained in a regular coffee. It is also important to maintain coffee components beneficial for human nutrition (e.g., tannins, carbohydrates, alkaloids, various mineral substances—some several hundreds of organic compounds), which ultimately constitute the unique coffee aroma. However, these requirements are often subjective and contradictory.

Conventional instant freeze-dried coffee typically preserves well the beneficial qualities of components contained in the regular coffee beans. However, in order to improve the taste and the aroma, there is a need to draw the volatile aroma fractions out of coffee substrate at the certain production stage, and then recover them in the processing at another (later) production stage. Also, other methods to make the taste and aroma of instant coffee close to the regular coffee are used. These methods are described in detail in the following publications:

Application RU 2003122213, published on Feb. 20, 2005, Craft Foods Holdings, Inc. (US) "Composition of coffee aroma, aromatic composition for preparing coffee drink and composition of instant coffee";

Application RU 2002107325(A), published on Feb. 20, 2005, Société de Produits Nestlé S. A., "Method for extracting coffee aromatic components and aromatized powder soluble coffee containing coffee aromatic components"; and Application KR 20040082227 A, published on Sep. 24, 2004. "Production of instant coffee product containing aroma extract while having palatability and flavor similar to green coffee beans"

A conventional method for instant freeze-dried coffee production includes raw material preparation (cleaning and scaling of green coffee beans), mixing of coffee beans based on a certain recipe (mix of various green coffee types in a necessary ratio), roasting, cooling, grinding followed by the extraction of resulting mixture, mixture concentrating, filtration and sublimation (freezing, breaking up the frozen extract particles, freeze-drying), pre-packaging and packaging. This method is described in detail in the following publications:

Application FR 2003131184, published on Jan. 20, 2005, Société de Produits NestléS. A., Coffee aroma-containing component and method of its preparation;

F. G. Nakhmedov., Coffee products technology. M: Light and food industry, 1984, p. 79.

It is possible to use the above technological production cycle partially, when a special substrate used for sublimation—a concentrated liquid extract is taken in a ready-to-use form. For example, this extract can be obtained from other manufacturers or received from a long-term storage warehouse.

The main disadvantage of the standard method is the fact that the obtained highly soluble freeze-dried granules do not possess the taste and the aroma characteristics of a fresh regular coffee, because during the course of full coffee processing, a considerable loss of the aroma, as well as of coffee taste-generating substances, occurs.

The purpose of obtaining freeze-dried coffee with organic characteristics of regular roasted coffee cannot be solved by simply mixing ingredients in a cup or during the process of the final product packaging. The packaged coffee product has to be homogeneous, and the dissolved coffee should have an attractive and appetizing look.

Accordingly, there is a need for a method for preserving the organic qualities of regular freshly brewed coffee in the production process of instant freeze-dried coffee.

SUMMARY OF THE INVENTION

The present invention is related to instant freeze-dried coffee composition and production method that substantially obviates one or several of the disadvantages of the related art.

According to one exemplary embodiment, a coffee composition based on instant freeze-dried coffee with the taste and aroma characteristics of a regular roasted coffee is provided. A method for obtaining the composition by processing regular roasted fine ground coffee through concentrated liquid coffee extract. This processing combined with freeze drying produces uniformly structured freeze-dried granules with uniform content of regular roasted fine ground coffee inside the granules.

Additional features and advantages of the invention will be set forth in the description that follows, and in part will be apparent from the description, or may be learned by practice of the invention. The advantages of the invention will be realized and attained by the structure particularly pointed out in the written description and claims hereof.

It is to be understood that both the foregoing general description and the following detailed description are exemplary and explanatory and are intended to provide further explanation of the invention as claimed.

DETAILED DESCRIPTION OF THE PREFERRED EMBODIMENTS

Reference will now be made in detail to the preferred embodiments of the present invention, examples of which are discussed below.

According to the exemplary embodiment, a coffee composition based on instant freeze-dried coffee with the taste and aroma characteristics of a regular roasted coffee is provided. A method for obtaining the composition n by processing regular roasted fine ground coffee through concentrated liquid coffee extract is described. This processing is combined with freeze drying produces uniformly structured freeze-dried granules, with uniform content of regular roasted fine ground coffee inside the granules.

According to the exemplary embodiment, the above objective is achieved due to the fact that the coffee composition contains regular roasted fine ground coffee that is evenly embedded inside the freeze-dried granules that are homogeneous in structure. This allows for preservation of the taste and aroma inherent to regular roasted coffee when water is added to the final product.

According to the proposed method, the instant freeze-dried coffee having the taste and aroma of freshly brewed regular coffee is produced. The regular roasted fine ground coffee is added to the concentrated liquid coffee extract before foaming at a reduced temperature (for example, below 10° C.). Fine grinding of the coffee provides uniform content of the particles inside the granules of the produced freeze-dried coffee product. According to the exemplary method, extraction speed of aromatic and gustatory substances from the coffee is commensurable to the speed of dissolving of the freeze-dried coffee in a cup.

According to the proposed method, the regular roasted fine ground coffee of the required roast degree is added to the concentrated liquid coffee extract that is compiled from a mixture of green coffee beans in different ratios. The ratios within the mixture define the required organoleptic characteristics of the final product. Note that the roasting of the green coffee beans can be performed for each kind of beans separately or as a mixture.

The quantity of added regular roasted fine ground coffee is calculated based on the content of 4-30 weight % of regular roasted fine ground coffee in the produced freeze-dried coffee granules. The lower limit is determined by the minimal significant taste characteristics effect, the upper one—by maximum allowed sediment, while adding water to the final product. Thus, the final regular roasted fine ground coffee has the maximum particle size of about 200 µm.

The green regular coffee beans used for fine grinding undergo cleaning and roasting. The operations being the same as for manufacturing of the regular freeze-dried coffee. The green regular coffee beans are delivered to a special mill, which provides the fine grinding. Subsequently, the roasted fine ground coffee is passed through a system of sieves. The upper particle size limit (a maximum of 200 µm), is determined by the extraction rate (i.e., the rate of dissolving of aromatic substances) while adding hot water to a cup (about 1-2 min).

The lower limit (less than 65 µm), is determined by technical capabilities of the equipment and intense heating of ground powder while grinding. This leads to losses of volatile substances that determine the organoleptic characteristics of the regular roasted coffee.

According to the exemplary embodiment, it is possible to add regular roasted coffee of various types (for example, varieties of Arabica and/or Robusta) to the concentrated liquid coffee extract in a form of fine ground particles along with various insoluble food additives in required ratios, for example, cardamom in the ratios depending on the requested intensity of flavor. This provides the freeze-dried coffee with additional profiles, and/or aroma concentrate. At or before prepackaging, it is possible to add coffee oil to the ready freeze-dried granules, for example, 0.5-0.7% oil added to final product.

The quantity of the added regular roasted fine ground coffee is calculated based on the content of 4-30 weight % of regular roasted fine ground coffee in the final freeze-dried coffee granules. The roasting of green regular coffee beans is carried out at the temperature over 200° C., e.g., up to 220° C. and lasts up to 15 minutes, depending on the required degree of roasting. Special mills are used for producing the required level of grinding of regular roasted coffee beans.

According to the exemplary embodiment, the concentrated liquid coffee extract, containing regular roasted fine ground coffee, is foamed by the mixture of nitrogen and carbon dioxide right before the process of freeze-drying. Then, all standard freeze-drying stages are carried out. The formed freeze-dried granules, containing regular roasted fine ground coffee inside, are then ready for use and packaging.

As the result of the described process, regular roasted fine ground coffee is uniformly embedded inside freeze-dried coffee granules. As a result, regular roasted fine ground coffee is uniformly distributed in the freeze-dried particles. Thus, aromatic and taste characteristics of regular roasted coffee are advantageously preserved in the final product, while a visual homogeneity of freeze-dried granules is not affected (i.e., there is no visual indication of the presence of fine ground coffee).

The method in accordance with the exemplary embodiment can be illustrated by the following example. A raw material for producing freeze-dried coffee concentrated liquid extract is made from Arabica coffee mixture (50% Kenyan, 20% Columbian, 30% Guatemalan). Columbian Arabica regular roasted fine ground coffee is added to the liquid on the basis of 5% content in final freeze-dried granules. The roasting, with subsequent cooling, is done in a conventional way.

After fine grinding is performed in a special mill, a fraction was selected with particle size of 65-80 µm, which had the extraction rate of 30 seconds when adding hot water to a cup. This coincides with full dissolving of freeze-dried coffee, equaling to the effect of consumption of regular freshly brewed coffee. However, this does not require boiling and provides uniform content of regular roasted fine ground coffee in freeze-dried granules.

The concentrated liquid coffee extract, containing regular roasted fine ground coffee, was then foamed by mixture of nitrogen and carbon dioxide. Subsequently the foam is removed and freeze drying with breaking to granules is performed in a conventional manner.

As the result, the desired coffee composition has been obtained. The freeze-dried coffee granules ready for packing and packaging have been produced. The produced granules contain regular roasted fine ground coffee inside and possess rich coffee aroma of freshly brewed regular coffee and color spectrum of freeze-dried granules ranging from light to dark brown. Note that the time of dissolving of the coffee granules produced by this method in water at the temperature 96° C. does not exceed 30 seconds, which is typical for instant coffee. However, the produced coffee has practically no sediment, unlike freshly brewed regular roasted and ground coffee.

Having thus described a preferred embodiment, it should be apparent to those skilled in the art that certain advantages of the described method have been achieved.

It should also be appreciated that various modifications, adaptations and alternative embodiments thereof may be made within the scope and spirit of the present invention. The invention is further defined by the following claims.

What is claimed is:

1. A coffee composition comprising:
   foamed freeze-dried granules comprising instant coffee and a plurality of roasted fine-ground coffee particles evenly distributed throughout the foamed freeze-dried granules, the fine-ground coffee particles having a particle size of 65 microns to 200 microns present in an amount of 4-29 wt. % of the foamed, freeze-dried granules;
   wherein the foamed, freeze-dried granules vary in color from light brown to dark brown, and have a substantially uniform structure;
   wherein a dissolving rate of the foamed freeze-dried granules coincides with an extraction rate of the aromatic and gustatory substances of regular roasted fine-ground coffee particles present in the foamed freeze-dried granules, when adding water with a temperature of 96° C.; and wherein a drink made from the foamed freeze-dried granules has the taste and aroma of freshly brewed coffee.

2. The composition as recited in claim 1, further comprising coffee oil.

3. A method of production of a coffee composition, said method comprising:
   (a) grinding regular roasted coffee to produce a plurality of particles of regular roasted fine-ground coffee with a particle size of 65 microns to 200 microns;
   (b) adding the plurality of regular roasted fine-ground coffee particles to a concentrated liquid coffee extract;
   (c) foaming the concentrated liquid coffee extract with regular roasted fine coffee particles therein to form a foamed mixture; and
   (d) freeze-drying the foamed mixture to form foamed freeze-dried granules, wherein the plurality of roasted fine-ground coffee particles are evenly distributed throughout the foamed freeze-dried granules;

wherein a dissolving rate of the foamed freeze-dried granules coincides with the extraction rate of the aromatic and gustatory substances of the regular roasted fine-ground coffee particles present in the foamed freeze-dried granules, when adding water with a temperature of 96° C.; and wherein a drink made from the foamed freeze-dried granules has the taste and aroma of freshly brewed coffee.

4. The method of claim 3, wherein the plurality of roasted fine ground coffee particles are produced from one or more types of green coffee beans or a mixture thereof.

5. The method of claim 4, further comprising separately roasting the mixture of green coffee beans.

6. The method of claim 4, further comprising simultaneously roasting the mixture of green coffee beans.

7. The method of claim 3, further comprising adding at least one of a plurality of regular roasted fine ground coffee particles, insoluble food additives and/or aroma concentrate to the concentrated liquid coffee extract.

8. The method of claim 3, further comprising adding coffee oil before packaging.

9. The method of claim 4, wherein the foaming is performed using nitrogen and carbon dioxide.

\* \* \* \* \*